United States Patent
Alanen et al.

(10) Patent No.: US 6,714,159 B1
(45) Date of Patent: Mar. 30, 2004

(54) METHOD FOR PERFORMING POSITIONING AND AN ELECTRONIC DEVICE

(75) Inventors: Kimmo Alanen, Tampere (FI); Jari Syrjärinne, Tampere (FI)

(73) Assignee: Nokia Corporation (FI)

( * ) Notice: Subject to any disclaimer, the term of this patent is extended or adjusted under 35 U.S.C. 154(b) by 0 days.

(21) Appl. No.: 10/246,129

(22) Filed: Sep. 16, 2002

(30) Foreign Application Priority Data

Sep. 17, 2001 (FI) .............................................. 20011829

(51) Int. Cl.[7] .............................................. H04B 7/185
(52) U.S. Cl. .............................. 342/357.13; 342/357.12
(58) Field of Search ........................ 342/357.06, 357.12, 342/357.13, 357.15

(56) References Cited

U.S. PATENT DOCUMENTS

| | | | |
|---|---|---|---|
| 4,918,609 A | 4/1990 | Yamawaki | 364/449 |
| 5,430,657 A | 7/1995 | Kyrtsos | 364/459 |
| 5,764,184 A | 6/1998 | Hatch et al. | 342/357 |
| 5,828,336 A | 10/1998 | Yunck et al. | 342/357 |
| 5,831,574 A * | 11/1998 | Krasner | 342/357.08 |
| 6,104,338 A * | 8/2000 | Krasner | 342/357.06 |
| 6,184,824 B1 | 2/2001 | Bode et al. | 342/357.15 |
| 6,191,731 B1 | 2/2001 | McBurney et al. | 342/357.05 |

OTHER PUBLICATIONS

Patent Abstracts of Japan 2001305207 A, (Oct. 31, 2001) and Japanese Patent Application 2000118596 (Apr. 19, 2000), Sony Corp.

* cited by examiner

Primary Examiner—Thomas H. Tarcza
Assistant Examiner—F H Mull
(74) Attorney, Agent, or Firm—Ware, Fressola, Van Der Sluys & Adolphson LLP

(57) ABSTRACT

The invention relates to a method for performing positioning, in which a spread spectrum signal modulated with a repetition code and transmitted by satellites, is received. The method comprises the steps of acquiring the received, spread spectrum modulated signal, measuring the code phase of the received, spread spectrum modulated signal, and receiving the Ephemeris parameters of satellites which are used in the positioning. Furthermore, in the method, said code phase measurement results are stored, which have been measured at least partly before receiving the Ephemeris parameters, wherein the stored measurement results are used in the positioning after the Ephemeris parameters have been received.

12 Claims, 4 Drawing Sheets

METHOD FOR PERFORMING POSITIONING AND AN ELECTRONIC DEVICE

FIELD OF THE INVENTION

The present invention relates to a method for performing positioning, comprising the steps of receiving a signal transmitted by satellites and spread spectrum modulated with a repetition code, performing acquisition of the received spread spectrum modulated signal, measuring the code phase of the received spread spectrum modulated signal, and receiving satellite Ephemeris parameters which are used in the positioning. The invention also relates to an electronic device comprising means for performing positioning, comprising means for receiving a signal transmitted by satellites and spread spectrum modulated with a repetition code, means for acquisition of the received spread spectrum modulated signal, means for measuring the code phase of the received spread spectrum modulated signal, and means for receiving satellite Ephemeris parameters to be used in the positioning.

BACKGROUND OF THE INVENTION

In positioning systems based on satellite positioning, a positioning receiver attempts to receive the signals of at least four satellites in order to find out the position of the positioning receiver and the time data. An example of such a satellite positioning system is the GPS system (Global Positioning System), comprising a plurality of satellites orbiting the globe according to predefined orbits. These satellites transmit positioning data, on the basis of which the position of a satellite can be determined at each moment of time, in case the exact time data used in the satellite positioning system is known in the positioning receiver. In the GPS system, the satellites transmit a spread spectrum signal modulated with a code which is individual for each satellite. Thus, the positioning receiver can distinguish the signals transmitted by the different satellites from each other by using a reference code which is generated locally in the positioning receiver and corresponds to the satellite code.

Each operating satellite of the GPS system transmits a so-called L1 signal at the carrier frequency of 1575.42 MHz. This frequency is also indicated with $154f_0$, where $f_0=10.23$ MHz. Furthermore, the satellites transmit another ranging signal at a carrier frequency of 1227.6 MHz called L2, i.e. $120f_0$. In the satellite, the modulation of these signals is performed with at least one pseudo sequence. This pseudo sequence is different for each satellite. As a result of modulation, a code-modulated wideband signal is generated. The modulation technique used in the receiver makes it possible to distinguish between the signals transmitted by different satellites, although the carrier frequencies used in the transmission are substantially the same. This modulation technique is called code division multiple access (CDMA). In each satellite, for modulating the L1 signal, the pseudo sequence used is e.g. a so-called C/A code (Coarse/Acquisition code), which is a code from the family of the Gold codes. Each GPS satellite transmits a signal by using an individual C/A code. The codes are formed as a modulo-2 sum of two 1023-bit binary sequences. The first binary sequence G1 is formed with the polynome $X^{10}+X^3+1$, and the second binary sequence G2 is formed by delaying the polynome $X^{10}+X^9+X^8+X^6+X^3+X^2+1$ in such a way that the delay is different for each satellite. This arrangement makes it possible to generate different C/A codes by using identical code generators. The C/A codes are thus binary codes whose chipping rate in the GPS system is 1.023 MHz. The C/A code comprises 1023 chips, wherein the iteration time (epoch) of the code is 1 ms. The carrier of the L1 signal is further modulated by navigation information at a bit rate of 50 bit/s. The navigation information comprises information about the "health", orbit, time data of the satellite, etc.

To detect the signals of the satellites and to identify the satellites, the receiver must perform acquisition, whereby the receiver searches for the signal of each satellite at the time and attempts to be synchronized and locked to this signal so that the information transmitted with the signal can be received and demodulated.

The positioning receiver must perform the acquisition e.g. when the receiver is turned on and also in a situation in which the receiver has not been capable of receiving the signal of any satellite for a long time. Such a situation can easily occur e.g. in portable devices, because the device is moving and the antenna of the device is not always in an optimal position in relation to the satellites, which impairs the strength of the signal coming in the receiver. In portable device, the aim is also to reduce the power consumption to a minimum. Thus, for example, a positioning receiver arranged in connection with a wireless communication device is not necessarily kept in operation all the time, but primarily when there is a need to perform positioning. This causes, e.g., the problem that the time taken for the positioning is relatively long, because the positioning receiver must first perform acquisition, after which it starts to receive navigation information either from the satellite signal or, e.g., from a base station in a mobile communication network. The positioning receiver can perform the positioning first after it has received a sufficient quantity of navigation information. Furthermore, the positioning receiver must take pseudo range measurements which, in receivers of prior art, are started after receiving at least the satellite Ephemeris parameters of the navigation information. This will prolong the time taken from the turning on of the positioning receiver to the completion of the first position-time fix.

In devices which are particularly intended for positioning, positioning is performed continuously, wherein the time taken for obtaining this first location-time fix is not a particularly big problem in view of continuous use under good signal conditions. However, in some portable electronic devices with also other functions than the positioning receiver, the positioning receiver is turned off for a majority of the operating time of the electronic device, to prolong the operating time of the batteries. Thus, there is often a need to perform positioning in a situation in which sufficiently up-to-date previous positioning data or navigation information is not available. Thus, the time taken for the first location-time fix may be inconveniently long. In some situations, for example when making an emergency call from a mobile communication device, it should be possible to determine the position of the mobile communication device quickly and so precisely that help can be directed to the correct location. Thus, the time taken for obtaining the first position time fix may delay the provision of help to a significant degree.

The positioning arrangement has two primary functions:
1. to calculate the pseudo range between the receiver and the different GPS satellites, and
2. to determine the position of the receiver by utilizing the calculated pseudo ranges and the position data of the satellites. The position data of the satellites at each time can be calculated on the basis of the Ephemeris and time correction data received from the satellites.

The distances to the satellites are called pseudo ranges, because the time is not accurately known in the receiver. Thus, the determinations of position and time are iterated until a sufficient accuracy is achieved with respect to time and position. Because time is not known with absolute precision, the position and the time must be determined e.g. by linearizing a set of equations for each new iteration.

The calculation of the pseudo range can be performed, for example, by measuring the code phases of the satellite-signals in the receiver.

The above-mentioned acquisition and frequency control process must be performed for each signal of a satellite which is received in the receiver. Some receivers may have several receiving channels, wherein an attempt is made on each receiving channel to acquire the signal of one satellite at a time and to find out the information transmitted by this satellite.

The positioning receiver receives information transmitted by satellites and performs positioning on the basis of the received information. For the positioning, the receiver must receive the signal transmitted by at least four different satellites to find out the x, y, z coordinates and the time data. The received navigation information is stored in a memory, wherein this stored information can be used to find out e.g. the Ephemeris data of satellites.

FIG. 1 shows, in a principle chart, positioning in a mobile communication device MS comprising a positioning receiver by means of a signal transmitted from four satellites SV1, SV2, SV3, SV4. In the GPS system, the satellites transmit Ephemeris data as well as time data, on the basis of which the positioning receiver can perform calculations to determine the position of the satellite at a time. These Ephemeris data and time data are transmitted in frames (not shown in the appended figures) which are further divided into subframes. In the GPS system, each frame comprises 1500 bits which are divided into five subframes of 300 bits each. Since the transmission of one bit takes 20 ms, the transmission of each subframe will thus take 6 s, and the whole frame will be transmitted in 30 seconds. The subframes are numbered from 1 to 5. In each subframe 1, e.g. time data is transmitted, indicating the moment of transmission of the subframe as well as information about the deviation of the satellite clock with respect to the time in the GPS system.

The subframes 2 and 3 are used for the transmission of Ephemeris data. The subframe 4 contains other system information, such as universal time, coordinated (UTC). The subframe 5 is intended for the transmission of almanac data of all the satellites. The entity of these subframes and frames is called a GPS navigation message, which comprises 25 frames, i.e. 125 subframes. The length of the navigation message is thus 12 min 30 s.

In the GPS system, time is measured in seconds from the beginning of a week. In the GPS system, the moment of beginning of a week is midnight between Saturday and Sunday. Each subframe to be transmitted contains information on the moment of the GPS week when the subframe in question was transmitted. Thus, the time data indicates the time of transmission of a certain bit, i.e. in the GPS system, the time of transmission of the last bit in the subframe in question. In the satellites, time is measured with high precision atomic chronometers. In spite of this, the operation of each satellite is controlled in a control centre for the GPS system (not shown), and e.g. a time comparison is performed to detect chronometric errors in the satellites and to transmit this information to the satellite.

In the receiver, the time of arrival $\hat{T}_{ToA}^k$ of the received signal can be determined for example in the following way:

$$\hat{T}_{ToA}^k = TOW^k + T_{ms}^k + T_{chip}^k + T_{\Delta chip}^k \quad (1)$$

in which $TOW^k$=the time data (time of week) contained in the last received subframe, $T_{ms}^k$=the time passed since the reception of the bit corresponding to the time data, for example, in the GPS system, the last bit of the last received subframe containing the time data, $T_{chip}^k$=the number (from 0 to 1022) of whole chips received after the change of the last epoch, $T_{\Delta chip}^k$=the code phase measured at the time of positioning, and k=the satellite index.

All the terms of Formula (1) to be summed up can be given in units of time (seconds). Further, the length of the chips and bits in time is known and it is substantially constant. As can be seen from Formula (1), only the last two terms in the determination of the moment of receiving a signal are related to the received signal as such. The other terms are related to information transmitted in this signal, and they are measured in relation to the received navigation information and the local reference time of the receiver.

The appended FIG. 2 illustrates this formula and its different terms, used for estimating the moment of reception of the signal received at the moment of positioning. It is obvious that FIG. 2 is simplified with respect to the real situation, because e.g. one epoch comprises 1023 chips, wherein it is not reasonable to illustrate them in detail. The moment of positioning is illustrated by a dash and dot line indicated with the reference SM.

The measurement of the last two terms in Formula (1) requires that the receiver is properly synchronized and locked to this signal. It is thus possible in the receiver to determine each chip and its phase by using a satellite reference code stored or generated in the receiver, and a code phase loop.

It is important to compute the time of transmission of the received signal for each signal to be tracked, because the local reference time of the receiver, formed by the local oscillator of the receiver, is coupled to the GPS time on the basis of these values. Furthermore, the different propagation times of signals received from different satellites can be deduced from these measured values, because each satellite transmits the same chip substantially at the same time. Even though there may be minor differences in the timings of different satellites, they are monitored, and the error data is transmitted in the GPS navigation message, as was already mentioned above.

The time data (ToW) is transmitted in the navigation message at intervals of six seconds and it indicates the time passed from the last change of the GPS week. Thus, the value range of the time data is the remainder of one week. In a corresponding manner $T_{ms}^k$ equals the remainder of six seconds and $T_{chip}^k$ equals the remainder of 1 ms.

SUMMARY OF THE INVENTION

It is an aim of the present invention to achieve an accelerated method for performing positioning, particularly in positioning receivers in which the positioning receiver is not continuously synchronized with the satellite signal. The invention is based on the idea that results of pseudo range measurements are stored in a memory already before Ephemeris parameters have been received for positioning.

Thus, these previously stored measurement results can be used for positioning after receiving the Ephemeris parameters. To put it more precisely, the method according to the present invention is primarily characterized in that, in the method, said code phase measurement results, which have been at least partly measured before receiving the Ephemeris parameters, are stored, wherein the stored measurement results are used in the positioning after the Ephemeris parameters have been received. The electronic device according to the present invention is primarily characterized in that the electronic device further comprises at least means for storing said code phase measurement results, which have been at least partly measured before receiving the Ephemeris parameters, and means for using said stored measurement results in the positioning after Ephemeris parameters have been received.

Considerable advantages are achieved by the present invention when compared with positioning systems and receivers of prior art. In the method according to the invention, pseudo range measurements are also stored before navigation information is available in the receiver; therefore, the positioning can be started substantially immediately after a sufficient quantity of navigation information has been received. Thus, the positioning can be performed faster and the time to first fix (TTFF) is smaller than in receivers of prior art. Furthermore, the first fix can be made more reliable, because more measurement data is available for the computation of the fix than when applying methods of prior art. The method of the invention is particularly advantageous in such devices in which positioning is, for example to save the batteries, not performed continuously but e.g. under the control of the user or at intervals.

DESCRIPTION OF THE DRAWINGS

In the following, the present invention will be described in more detail with reference to the appended drawings, in which.

DETAILED DESCRIPTION OF THE INVENTION

Figure 1:
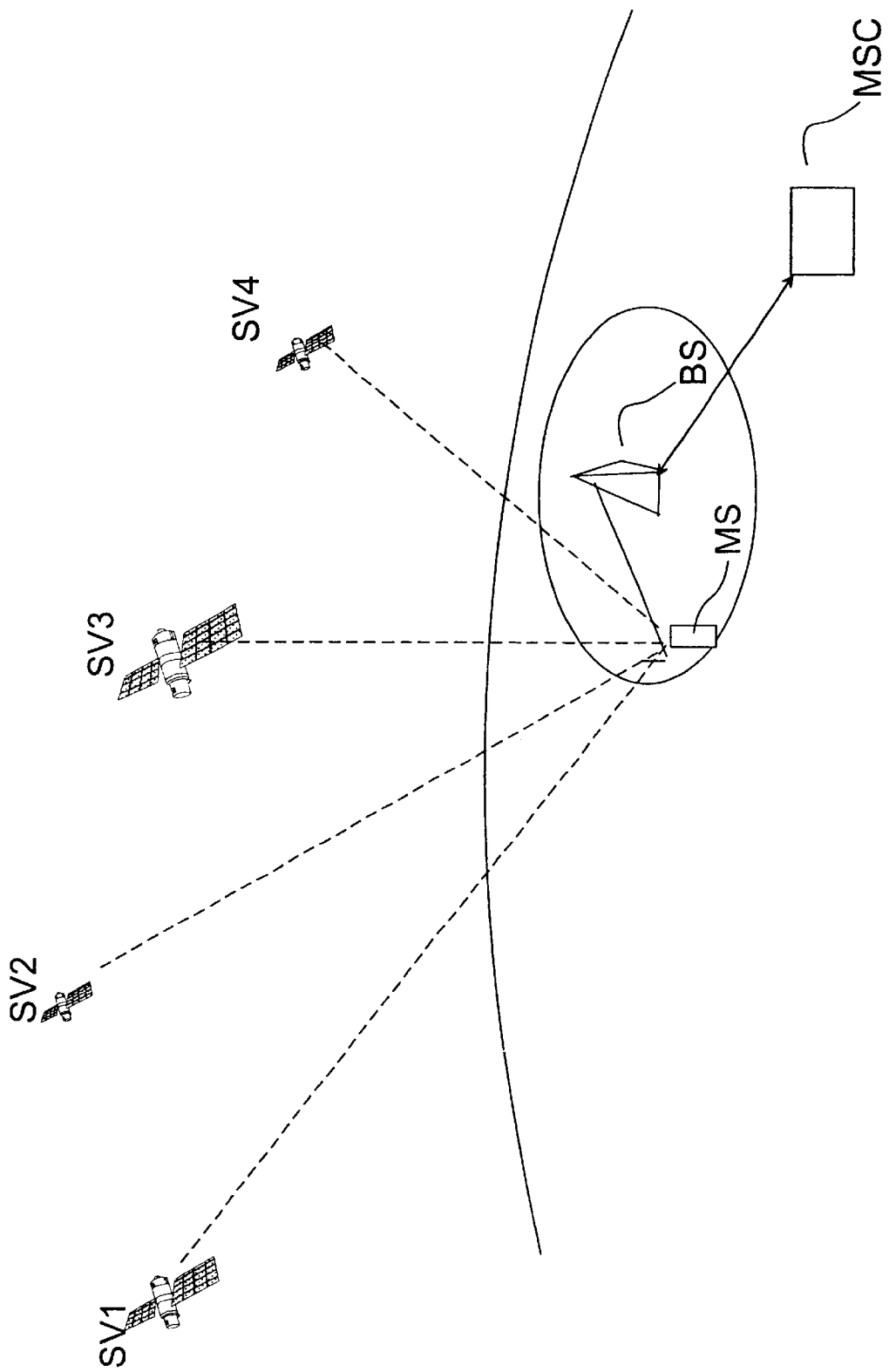
FIG. 1 shows, in a reduced principle chart, positioning by means of a signal transmitted from four satellites.
Figure 2:
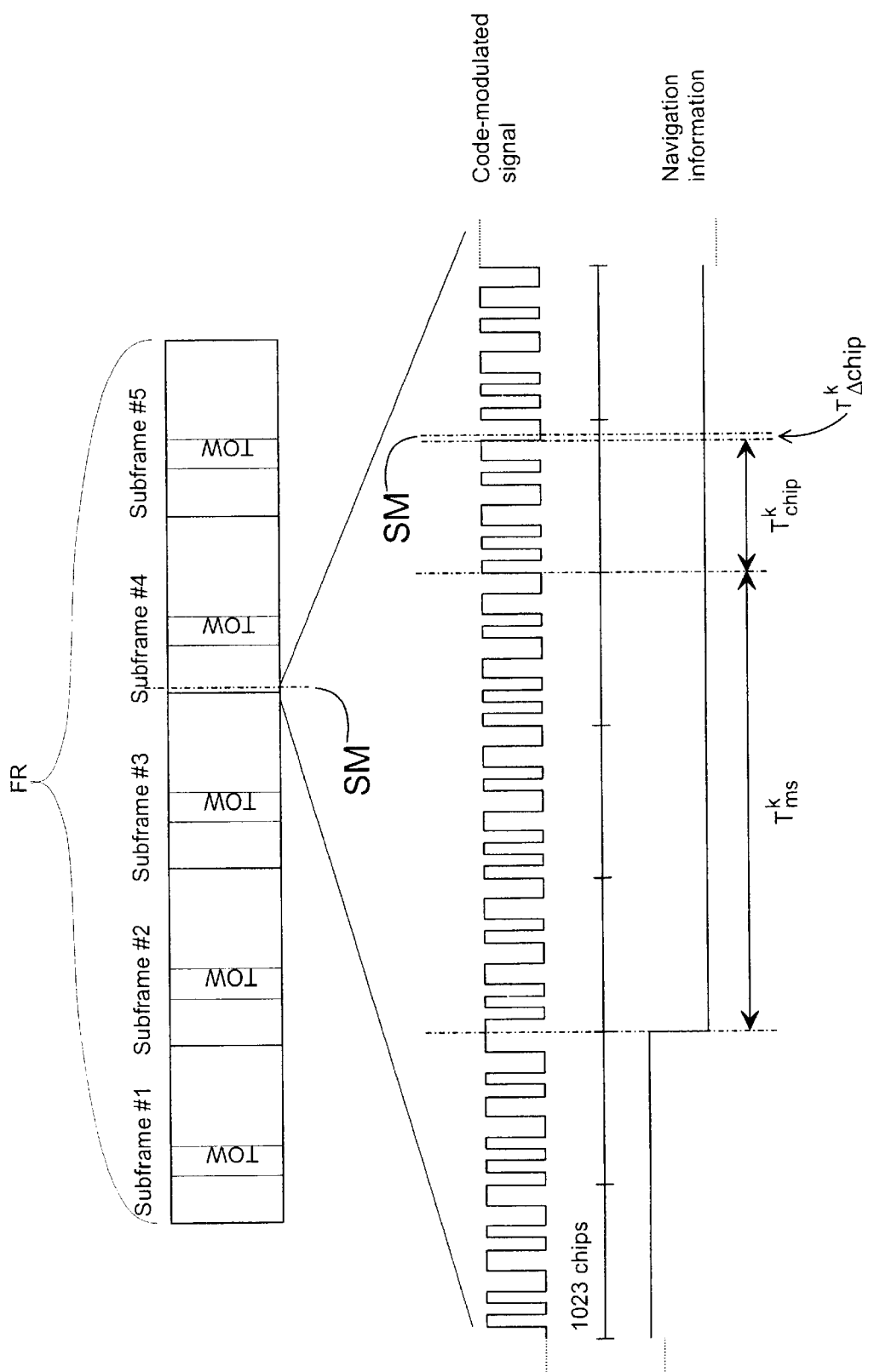
FIG. 2 illustrates a formula according to prior art with its different terms, which formula is used for estimating the time of transmission of a signal received at a time of positioning.
Figure 3:
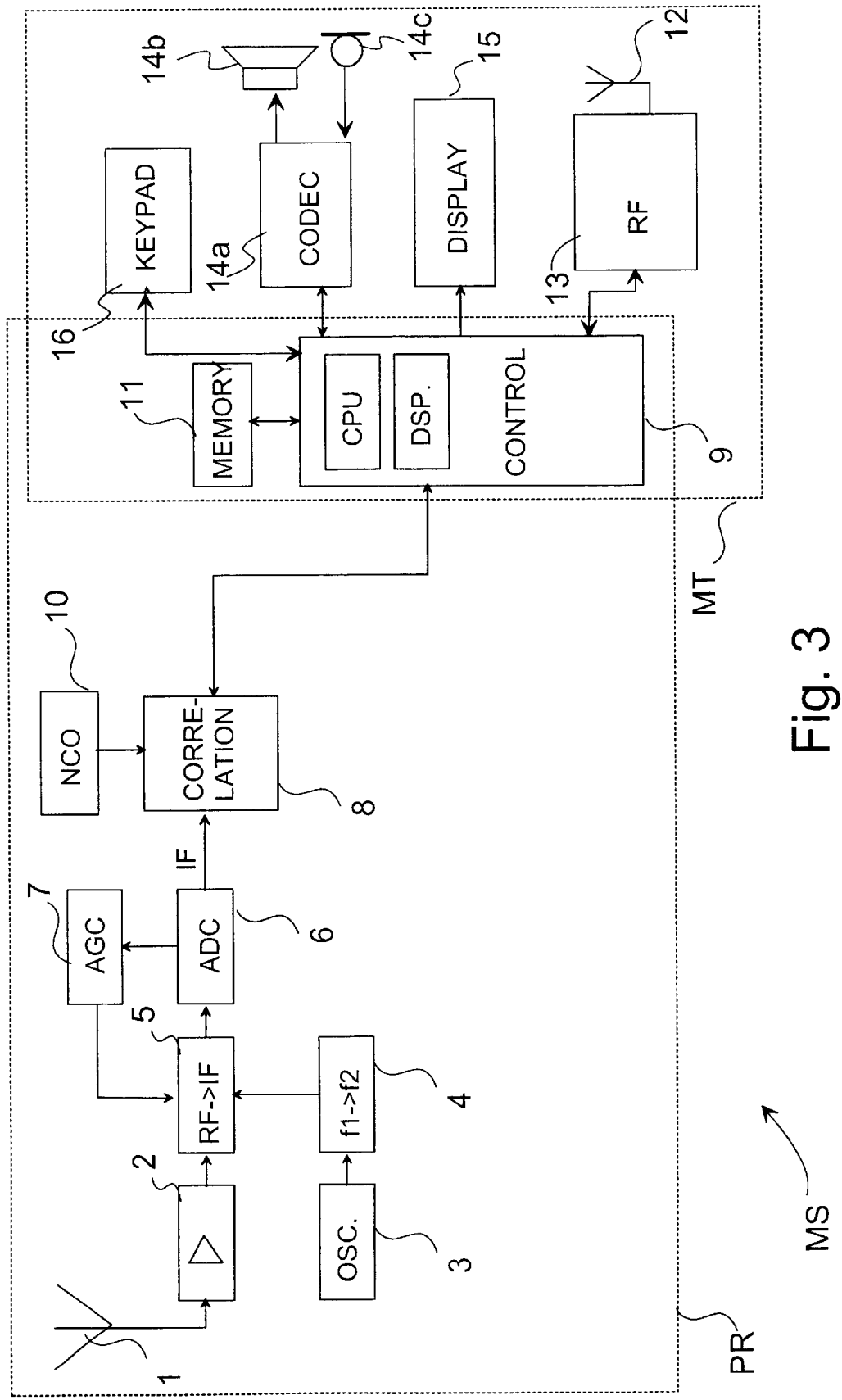
FIG. 3 shows an electronic device according to a preferred embodiment of the invention in a simplified block diagram.

In the following, the operation of the method according to a preferred embodiment of the invention will be described with reference to the system shown in FIG. 3. An electronic device that performs positioning is exemplified by an electronic device MS, which comprises, in addition to the mobile communication means MT, also a positioning receiver PR. In this case, the mobile communication means MT can be used for transmitting information between the mobile communication device MS and base stations BS, BS', BS" in a mobile communication network MN.

In the receiver PR, the repetition coded signal to be received via an antenna 1 is amplified in a high-frequency amplifier 2 and is modified in a modifying block 5, by means of a clock signal generated by a clock generator 3 and a frequency synthesizer 4, preferably to an intermediate frequency or directly to the baseband. At this stage, the signal is advantageously still in analog format, so that it is converted to a digital signal in an analog to digital converter 6. The analog-to-digital converter 6 provides not only a digital receiving signal but also a control to an automatic gain control (AGC) block 7 to level out variations in the strength of the received signal in a way known as such. The digital signal converted to an intermediate frequency or to the baseband is led to one or more digital monitoring blocks 8 to perform conversion of the digital signal to two signals with different phases (I/Q) and multiplication with a reference code. The signals formed in the monitoring block 8 are further led to a control block 9, preferably to a digital signal processor DSP, to find out the code phase and frequency shift of the received signal. The control block 9 forms feedback to the monitoring block 8, to adjust the code phase of the reference code and a numerically controlled oscillator 10, if necessary. After the code phase and the frequency shift have been determined, that is, the receiver has tracked the signal to be received, it is possible to start the signal pseudo range measurements and the demodulation and storage of the navigation information transmitted in the signal, if possible. The control block 9 preferably stores navigation information in a memory 11. The receiver PR may also receive navigation information, for example, with the mobile communication means MT from a mobile switching centre MSC via the base station BS of the mobile communication network.

Demodulation and storage are preferably performed substantially simultaneously for all the receiving channels, on which a satellite signal can be detected. Thus, the moment of reception of the received signal is substantially the same on each receiving channel. When it is desired to perform positioning, it is examined, preferably in the digital signal processor DSP of the control block 9, whether the necessary navigation information (satellite Ephemeris parameters) has been received. If there is sufficiently navigation information stored in the memory 11, the moment of transmission of the received signals is preferably computed on the basis of Formula (1). However, if sufficient navigation information has not been received, in the method according to a preferred embodiment of the invention the received signals are measured to determine the pseudo ranges and the measurement results are stored. The measurement and storage are performed for each receiving channel on which a signal transmitted by a satellite has been detected and which the receiver has tracked. Of the signals, measurement information related to the pseudo ranges is stored, i.e. the number $T_{chip}^{k}$ and code phase $T_{\Delta chip}^{k}$ of chips received after a change in the code phase. Furthermore, data about the reference time of the receiver at the moment of reception of the signals is stored in connection with the stored measurement information. Thus, this stored information can be used, for example, to determine the pseudo ranges and to find out the error in the reference time of the receiver. Signal reception and storage are repeated preferably at regular intervals.

Figure 4:
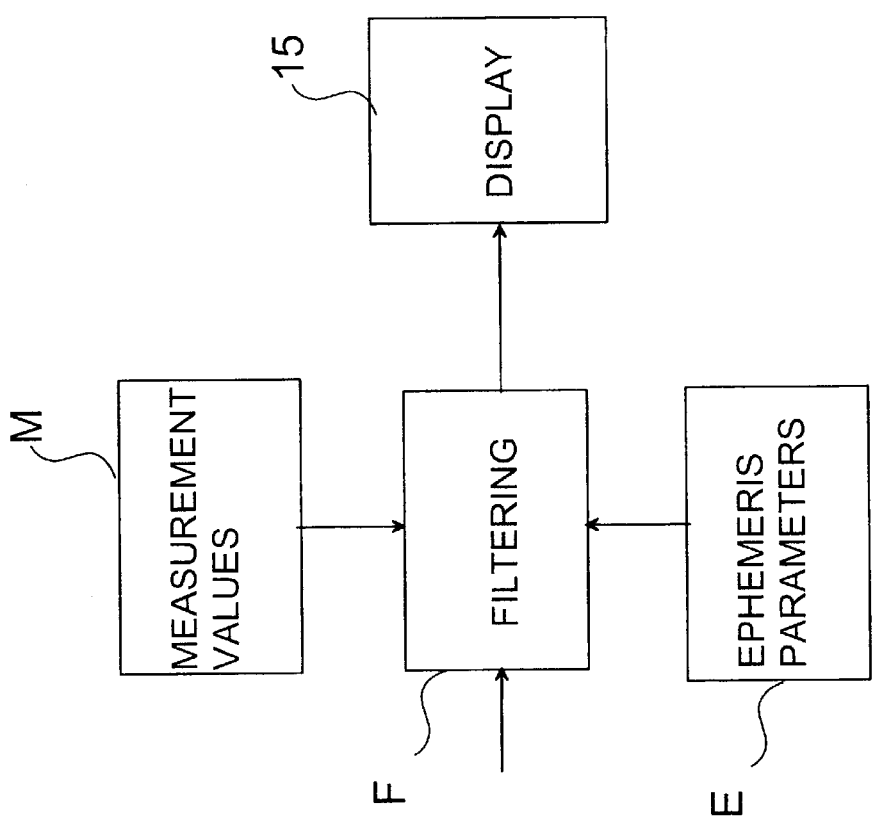
FIG. 4 shows a detail of an electronic device according to a preferred embodiment of the invention in a simplified block diagram.

If the strength of the received signal is sufficient for demodulation of the information transmitted in the signal, the information transmitted in the signal is demodulated in addition to the above mentioned storage step. This information contains, inter alia, navigation information which can be used in the positioning. When there is a sufficient quantity of navigation information available in the receiver PR, the positioning is started. This step is illustrated in a reduced manner in the block chart of FIG. 4. For the positioning, the stored measurement information M, the reception time data related to the stored measurement information, and the Ephemeris parameters E are used. The stored measurement information is led to a filter F in which the measurement information M is filtered, e.g. to reduce the effect of measurement noise. As the filter F, it is preferable to use a Kalman filter, known as such, which also uses previously stored measurement results in the filtering. In this way, even the first positioning can be performed faster and the result is closer to the correct one than in the case if the measurement of pseudo ranges were started first after the Ephemeris parameters of the satellites were available to the receiver. The positioning computation can be performed by a method known as such, for example by the above presented Formula (1). The positioning result can be displayed for example on a display 15.

According to Formula (1), the determination of the time of transmission ToT comprises five parts, of which the two last ones, i.e. the number $T_{chip}^{k}$ and code phase $T_{\Delta chip}^{k}$ of chips received after the change of the code phase, correspond to the stored information. The first three terms can be found out from the navigation information.

From the navigation information, it is possible to find out the location of the satellite which transmitted the signal at the moment of the transmission of the signal. However, because the time data of the receiver is not necessarily precisely correct, it is not possible to make the position precisely correct either. Nevertheless, by using several stored measurement results, it is possible to make the positioning more precise by repeating the filtering until a sufficient precision has been achieved. Furthermore, by analysing a large quantity of measurement information, it is, in some situations, possible to find such measurement results which are clearly incorrect. These measurement results can thus be excluded from the positioning computation, which will improve the precision of the positioning.

A reference clock is formed, for example, by means of a real time clock (RTC) in the receiver MS, or it may also be formed by an external clock (not shown), or the time data may be obtained from an external network, such as a mobile communication network.

The mobile communication means MT preferably comprise a second antenna 12, a radio part 13, audio means, such as a codec 14a, a speaker 14b and a microphone 14c, a display 15 and a keyboard 16, and a memory 11. The control block 9 can be at least partly common to perform the functions of the receiver PR and to perform the functions of the mobile communication means MT, or separate processors or the like can be used for these functions.

It will be evident that the present invention is not limited solely to the above-presented embodiments, but it can be modified within the scope of the appended claims.

What is claimed is:

1. A method for performing positioning, comprising the steps of receiving a spread spectrum signal modulated with a repetition code and transmitted by satellites; performing acquisition of the received spread spectrum modulated signal; measuring the code phase of the received spread spectrum modulated signal; and receiving satellite position information to be used in the positioning, wherein in the method, said code phase measurement results, which have been measured at least partly before receiving the position information, are stored, wherein the stored measurement results are used for positioning after the position information has been received.

2. The method according to claim 1, wherein said measurement results are filtered.

3. The method according to claim 2, wherein a Kalman filter is used in the filtering.

4. The method according to claim 1, wherein position information is received from the signal transmitted by the satellites.

5. The method according to claim 1, wherein for performing the positioning, the spread spectrum modulated signal transmitted by at least four satellites is received, the code phase of each received signal is measured, the measurements results of each received signal are stored, the position information of said at least four satellites is received, wherein the positioning is performed after the position information of said at least four satellites has been received, and the measurement results stored from the received signals are used in the positioning.

6. An electronic device comprising means for performing positioning, comprising means for receiving a spread spectrum signal modulated with a repetition code and transmitted by satellites; means for acquiring the received spread spectrum modulated signal; means for measuring the code phase of the received spread spectrum modulated signal; and means for receiving the position information of satellites to be used in the positioning, the electronic device also comprising at least means for storing said code phase measurement results which have been measured at least partly before receiving the position information, and means for using said stored measurement results in the positioning after position information has been received.

7. The electronic device according to claim 6 also comprising means for filtering measurement results.

8. The electronic device according to claim 7, said means for filtering measurement results comprising a Kalman filter.

9. An electronic device according to claim, 6, wherein the means for receiving the position information of the satellites to be used in the positioning comprise means for receiving the position information from the signal transmitted by the satellites.

10. The electronic device according to claim 6, comprising means for receiving the signals transmitted by at least four satellites substantially simultaneously; means for measuring the code phase of each received spread spectrum modulated signal; means for storing the measurement results of the code phase of the signal of said at least four satellites, which have been measured at least partly before receiving the position information; means for receiving the position information of at least four satellites used in the positioning; and means for using said stored measurement results in the positioning after position information has been received.

11. A method for performing positioning, comprising the steps of receiving a spread spectrum signal modulated with a repetition code and transmitted by satellites; performing acquisition of the received spread spectrum modulated signal; measuring the code phase of the received spread spectrum modulated signal; and receiving satellite position information to be used in the positioning, wherein in the method, said code phase measurement results, which have been measured at least partly before receiving the position information from the signal transmitted by the satellites, are stored, wherein the stored measurement results are used for positioning after the position information has been received, in which method for performing the positioning, the spread spectrum modulated signal transmitted by at least four satellites is received, the code phase of each received signal is measured, the measurements results of each received signal are stored, the position information of said at least four satellites is received, wherein the positioning is performed after the position information of said at least four satellites has been received, and the measurement results stored from the received signals are used in the positioning.

12. An electronic device comprising means for performing positioning, comprising means for receiving a spread spectrum signal modulated with a repetition code and transmitted by satellites; means for acquiring the received spread spectrum modulated signal; means for measuring the code phase of the received spread spectrum modulated signal; means for receiving the position information of satellites to be used in the positioning; means for storing said code phase measurement results which have been measured at least partly before receiving the position information, means for using said stored measurement results in the positioning after position information has been received; means for receiving the signals transmitted by at least four satellites substantially simultaneously; means for measuring the code phase of each received spread spectrum modulated signal; means for storing the measurement results of the code phase of the signal of said at least four satellites, which have been measured at least partly before receiving the position information; means for receiving from the signals transmitted by the satellites the position information of at least four satellites used in the positioning; and means for using said stored measurement results in the positioning after position information has been received.

* * * * *